United States Patent
Lai

(10) Patent No.: US 7,349,035 B2
(45) Date of Patent: Mar. 25, 2008

(54) THIN FILM TRANSISTOR ARRAY SUBSTRATE HAVING PARTICULAR PATTERNED ELECTRODE

(75) Inventor: Han-Chung Lai, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 11/695,056

(22) Filed: Apr. 2, 2007

(65) Prior Publication Data

US 2007/0171318 A1    Jul. 26, 2007

Related U.S. Application Data

(62) Division of application No. 10/904,042, filed on Oct. 21, 2004, now Pat. No. 7,221,413.

(30) Foreign Application Priority Data

Aug. 5, 2004  (TW) ............... 93123443 A

(51) Int. Cl.
  *G02F 1/1343* (2006.01)
  *G02F 1/1333* (2006.01)
(52) U.S. Cl. .................. 349/38; 349/158; 349/54; 349/55
(58) Field of Classification Search ............ 349/38, 349/158, 54, 55
  See application file for complete search history.

(56) References Cited

U.S. PATENT DOCUMENTS

| | | | | |
|---|---|---|---|---|
| 6,356,318 | B1* | 3/2002 | Kawahata | 349/38 |
| 6,784,949 | B1* | 8/2004 | Nagata et al. | 349/39 |
| 6,831,318 | B2* | 12/2004 | Yonekura et al. | 257/296 |
| 6,894,735 | B2* | 5/2005 | Chae et al. | 349/38 |

\* cited by examiner

*Primary Examiner*—Mike Qi
(74) *Attorney, Agent, or Firm*—Jianq Chyun IP Office

(57) ABSTRACT

A thin film transistor array substrate including a substrate, scan lines, data lines, thin film transistors, pixel electrodes, common lines and a patterned upper electrode is provided. The scan lines and the data lines are disposed over the substrate to define pixel areas. Each thin film transistor is disposed within one of the pixel areas and is driven by one of the scan lines and data lines. Each pixel electrode is disposed within one of the pixel areas and is electrically connected to one of the thin film transistors. Common lines are disposed over the substrate such that a portion area of each pixel electrode is located above one of the common lines. The pattern upper electrode includes sub-upper electrodes disposed between the pixel electrode and the common line. The sub-upper electrodes are electrically connected to the pixel electrodes for coupling with the common lines to form a storage capacitor.

14 Claims, 11 Drawing Sheets

THIN FILM TRANSISTOR ARRAY SUBSTRATE HAVING PARTICULAR PATTERNED ELECTRODE

CROSS-REFERENCE TO RELATED APPLICATION

This application is a divisional of a prior application Ser. No. 10/904,042, filed Oct. 21, 2004 now U.S. Pat. No. 7,221,413, which has been allowed, and claims the priority benefit of Taiwan application No. 93123443, filed Aug. 5, 2004. The entirety of each of the above-mentioned patent applications is hereby incorporated by reference herein and made a part of this specification.

BACKGROUND OF THE INVENTION

1. Field of the Invention

The present invention relates to a thin film transistor array substrate and a repairing method thereof. More particularly, the present invention relates to a thin film transistor array substrate and a repairing method that minimizes the production of leaky storage capacitors.

2. Description of the Related Art

The rapid development of multimedia systems come about as a result of the progress in manufacturing semiconductor devices and monitors. In the past, cathode ray tubes (CRT) are the principal display devices in the market because of their fine display quality and moderate pricing. However, due to the bulkiness of CRT and the environmental concerns regarding the production of hazardous radiation and the high power consumption, CRT has been gradually phased out and replaced by more environ-friendly display devices with a compact, slim and light body. One such display device is the thin film transistor liquid crystal display (TFT-LCD). Because of the high display quality, superior spatial utilization, low power consumption and radiation free operation characteristics, TFT-LCD has become one of the mainstream products in the market.

A conventional thin film transistor liquid crystal display (TFT-LCD) typically comprises a thin film transistor (TFT) array, a color-filtering array substrate and a liquid crystal layer. The thin film transistor array substrate comprises an array of thin film transistors and a pixel electrode corresponding to each thin film transistor. Each thin film transistor serves as a switch in each liquid crystal display unit. In addition, a particular pixel unit is selected through a scan line and a data line. By applying a suitable operating voltage to select scan line and data line, pixel data is displayed on the pixel unit. In general, a portion area of the pixel electrode will cover the scan line or a common line so that the overlapping portion area can serve as a storage capacitor (Cst) and permit various pixels within the TFT-LCD to operate normally.

In the conventional process of fabricating the data line, the source and the drain, an upper electrode is also disposed between each pixel electrode and its corresponding common line (or scan line). Furthermore, the pixel electrode and the upper electrode are electrically connected so that the upper electrode, the common line (or scan line) and the dielectric layer between the two together form a storage capacitor having a metal-insulator-metal structure.

FIG. 1 is a top view of a portion of a conventional thin film transistor array substrate. FIG. 2 is a schematic cross-sectional view along line A-A' of the thin film transistor array substrate in FIG. 1. As shown in FIGS. 1 and 2, a conventional thin film transistor array substrate 100 mainly comprises a substrate 110, a plurality of scan lines 120, a plurality of data lines 130, a plurality of thin film transistors 140, a plurality of pixel electrodes 150, a plurality of common lines 160 (only one is shown) and a plurality of upper electrode 170.

The scan lines 120 and the data lines 130 are disposed over the substrate 110 to define a plurality of pixel areas 112. Each thin film transistor 140 is disposed inside one of the pixel areas 112 and is driven by one of the scan lines 120 and data lines 130. Each pixel electrode 150 is also disposed inside one of the pixel areas 112 and is electrically connected to one of the thin film transistors 140. The common line 160 is disposed over the substrate 110 such that a portion area of the pixel electrode 150 is above one of the common lines 160.

In addition, an upper electrode 170 is disposed between each pixel electrode 150 and one of the common lines 160. Furthermore, a dielectric layer 180 is disposed between the upper electrode 170 and the corresponding common line 160 for isolating the upper electrode 170 and the common line 160. Another dielectric layer 190 is also disposed between the upper electrode 170 and one of the pixel electrodes 150. The dielectric layer 190 has a contact 192 for connecting the upper electrode 170 and the corresponding pixel electrode 150 electrically together.

As shown in FIG. 2, the upper electrode 170 and the corresponding common line 160 together form a storage capacitor (Cst) that smooth out the normal operation of various pixels within the thin film transistor liquid crystal display. However, any processing defect or other factors may lead to some particles falling into the dielectric layer 180 or trapped in the defects within the dielectric layer 180 and produce a leaky capacitor. Ultimately, the display quality of the pixel will be compromised.

SUMMARY OF THE INVENTION

Accordingly, at least one objective of the present invention is to provide a thin film transistor array substrate and a repairing method that prevents any leakage current flowing between the upper and the lower electrode of a storage capacitor due to the presence of unwanted particles between the two.

To achieve these and other advantages and in accordance with the purpose of the invention, as embodied and broadly described herein, the invention provides a thin film transistor array substrate. The thin film transistor array substrate mainly comprises a substrate, a plurality of scan lines, a plurality of data lines, a plurality of thin film transistors, a plurality of pixel electrodes, a plurality of common lines and a patterned upper electrode. The scan lines and the data lines are disposed over the substrate to define a plurality of pixel areas. Each thin film transistor is disposed within one of the pixel areas and driven by one of the scan lines and one of the data lines. Each pixel electrode is also disposed within one of the pixel areas and is electrically connected to one of the thin film transistors. The common lines are disposed over the substrate such that a portion area of each pixel electrode is above one of the common lines. The patterned upper electrode is disposed between the pixel electrode and one of the common lines. The patterned upper electrode comprises a plurality of sub-upper electrodes. A portion area of each sub-upper electrode is electrically connected to one of the pixel electrodes.

The present invention also provides a second thin film transistor array substrate. The second thin film transistor array substrate mainly comprises a substrate, a plurality of scan lines, a plurality of data lines, a plurality of thin film transistors, a plurality of pixel electrodes and a patterned upper electrode. The scan lines and the data lines are disposed over the substrate to define a plurality of pixel areas. Each thin film transistor is disposed within one of the pixel areas and driven by one of the scan lines and one of the data lines. Each pixel electrode is also disposed within one of the pixel areas and is electrically connected to one of the thin film transistors. A portion area of each pixel electrode is above one of the scan lines. The patterned upper electrode is disposed between the pixel electrode and one of the scan lines. The patterned upper electrode comprises a plurality of sub-upper electrodes. A portion area of each sub-upper electrode is electrically connected to one of the pixel electrodes.

The present invention also provides a third thin film transistor array substrate. The third thin film transistor array substrate mainly comprises a substrate, a plurality of scan lines, a plurality of data lines, a plurality of thin film transistors, a plurality of pixel electrodes, a plurality of common lines and a patterned upper electrode. The scan lines and the data lines are disposed over the substrate to define a plurality of pixel areas. Each thin film transistor is disposed within one of the pixel areas and driven by one of the scan lines and one of the data lines. Each pixel electrode is also disposed within one of the pixel areas and is electrically connected to one of the thin film transistors. The common lines are disposed over the substrate such that a portion area of each pixel electrode is above one of the common lines. The patterned upper electrode is disposed between the pixel electrode and one of the common lines. The patterned upper electrode comprises a plurality of sub-upper electrodes. The sub-upper electrodes connect electrically with the pixel electrode such that the sub-upper electrodes and the common lines are coupled to form a plurality of capacitors. When at least one of the capacitors is a defective capacitor, the sub-upper electrode and one of the pixel electrodes of the defective capacitor are electrically isolated. Furthermore, a portion area of the other sub-upper electrodes is electrically connected to one of the pixel electrodes.

The present invention also provides a fourth thin film transistor array substrate. The fourth thin film transistor array substrate mainly comprises a substrate, a plurality of scan lines, a plurality of data lines, a plurality of thin film transistors, a plurality of pixel electrodes and a patterned upper electrode. The scan lines and the data lines are disposed over the substrate to define a plurality of pixel areas. Each thin film transistor is disposed within one of the pixel areas and driven by one of the scan lines and one of the data lines. Each pixel electrode is also disposed within one of the pixel areas and is electrically connected to one of the thin film transistors. A portion area of each pixel electrode is above one of the scan lines. The patterned upper electrode is disposed between the pixel electrode and one of the scan lines. The patterned upper electrode comprises a plurality of sub-upper electrodes. The sub-upper electrodes connect electrically with the pixel electrode such that the sub-upper electrodes and the scan lines are coupled to form a plurality of capacitors. When at least one of the capacitors is a defective capacitor, the sub-upper electrode and one of the pixel electrodes of the defective capacitor are electrically isolated. Furthermore, a portion area of the other sub-upper electrodes is electrically connected to one of the pixel electrodes.

The present invention also provides a method of repairing the aforementioned thin film transistor array substrate. A defective capacitor is formed when a particle/defect is produced between a sub-upper electrode and a common line or a scan line. The method of repairing the defective capacitor includes removing a portion area of the pixel electrode corresponding to the sub-upper electrode of a defective storage capacitor and isolating the pixel electrode and the corresponding sub-upper electrode of the defective storage capacitor.

The present invention also provides a fifth thin film transistor array substrate. The fifth thin film transistor array substrate mainly comprises a substrate, a plurality of scan lines, a plurality of data lines, a plurality of thin film transistors, a plurality of pixel electrodes, a plurality of common lines and an upper electrode. The scan lines and the data lines are disposed over the substrate to define a plurality of pixel areas. Each thin film transistor is disposed within one of the pixel areas and driven by one of the scan lines and one of the data lines. Each pixel electrode is also disposed within one of the pixel areas and is electrically connected to one of the thin film transistors. The common lines are disposed over the substrate such that a portion area of each pixel electrode is above one of the common lines. The upper electrode is disposed between the pixel electrode and one of the common lines. The upper electrode is electrically connected to the pixel electrode and the upper electrode and the common line are coupled together to form a plurality of capacitors. When at least one of the capacitors is defective, the upper electrode and the corresponding pixel electrode of the defective capacitor are electrically isolated. Furthermore, the upper electrode and the corresponding common line of the defective capacitor are welded together.

The present invention also provides a sixth thin film transistor array substrate. The sixth thin film transistor array substrate mainly comprises a substrate, a plurality of scan lines, a plurality of data lines, a plurality of thin film transistors, a plurality of pixel electrodes and an upper electrode. The scan lines and the data lines are disposed over the substrate to define a plurality of pixel areas. Each thin film transistor is disposed within one of the pixel areas and driven by one of the scan lines and one of the data lines. Each pixel electrode is also disposed within one of the pixel areas and is electrically connected to one of the thin film transistors. A portion area of each pixel electrode is above one of the scan lines. The upper electrode is disposed between the pixel electrode and one of the scan lines. The upper electrode is electrically connected to the pixel electrode and the upper electrode and the common line are coupled together to form a plurality of capacitors. When at least one of the capacitors is defective, the upper electrode and the corresponding pixel electrode of the defective capacitor are electrically isolated. Furthermore, the upper electrode and the corresponding scan line of the defective capacitor are welded together.

The present invention also provides a second method of repairing a thin film transistor array substrate. The method is particularly suitable for repairing the storage capacitor on gate (Cst on gate) or the storage capacitor on common line (Cst on common line) of a thin film transistor array substrate. A portion area of the each pixel electrode is disposed above one of the scan lines or one of the common lines. Furthermore, an upper electrode is disposed between the pixel electrode and the corresponding scan line or the common line. The pixel electrode and the upper electrode are electrically connected. A defective capacitor is formed when a particle/defect is produced between the upper electrode and the common line or the scan line. The met hod of repairing the defective capacitor includes removing a portion area of the pixel electrode corresponding to the upper electrode of a defective storage capacitor and electrically isolating the upper electrode and the corresponding pixel electrode of the defective storage capacitor. Thereafter, the upper electrode and the scan line or common line of the defective capacitor are welded together.

In the present invention, a patterned upper electrode comprising a plurality of sub-upper electrodes is disposed between each pixel electrode and corresponding common line (or scan line). A defective capacitor is formed when particles are formed in the material between one of the sub-upper electrodes and its corresponding common line (or scan line). By removing a portion area of the pixel electrode above the sub-upper electrode of the defective capacitor, the sub-upper electrode and the corresponding pixel electrode of the defective capacitor is electrically isolated. Hence, leakage between the upper and lower electrode of a storage capacitor due to the presence of particles or defects can be adefected.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
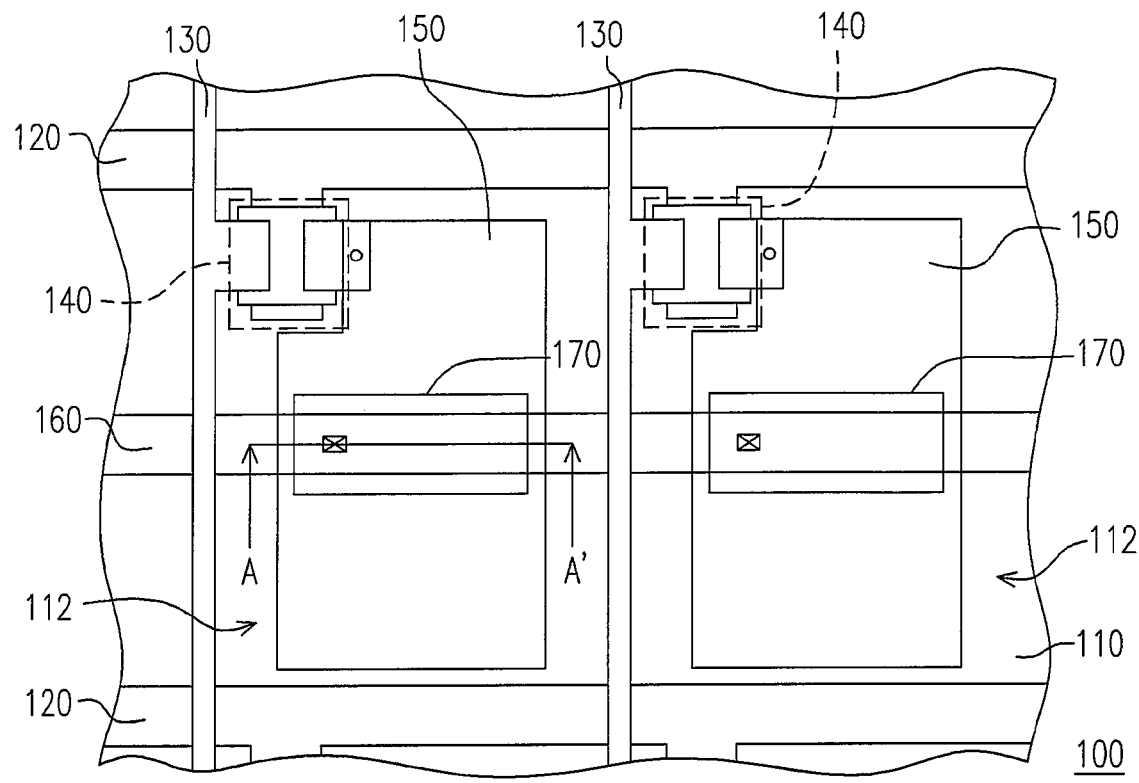
FIG. 1 is a top view of a portion of a conventional thin film transistor array substrate.
Figure 2:
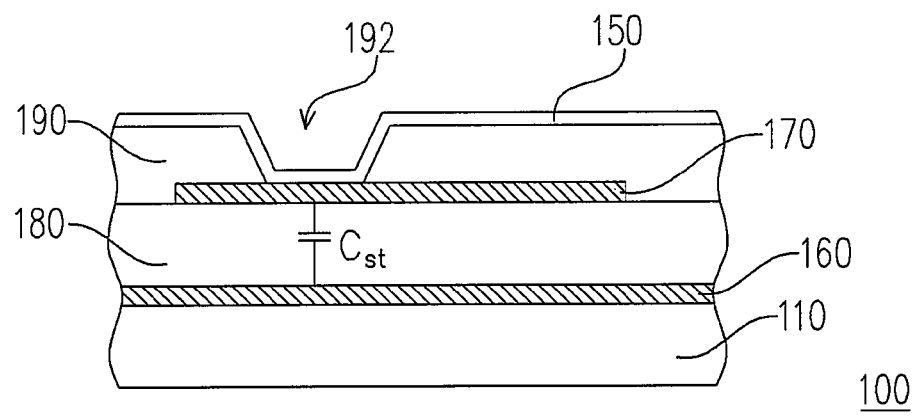
FIG. 2 is a schematic cross-sectional view along line A-A' of the thin film transistor array substrate in FIG. 1.

Reference will now be made in detail to the present preferred embodiments of the invention, examples of which are illustrated in the accompanying drawings. Wherever possible, the same reference numbers are used in the drawings and the description to refer to the same or like parts.

Figure 3:
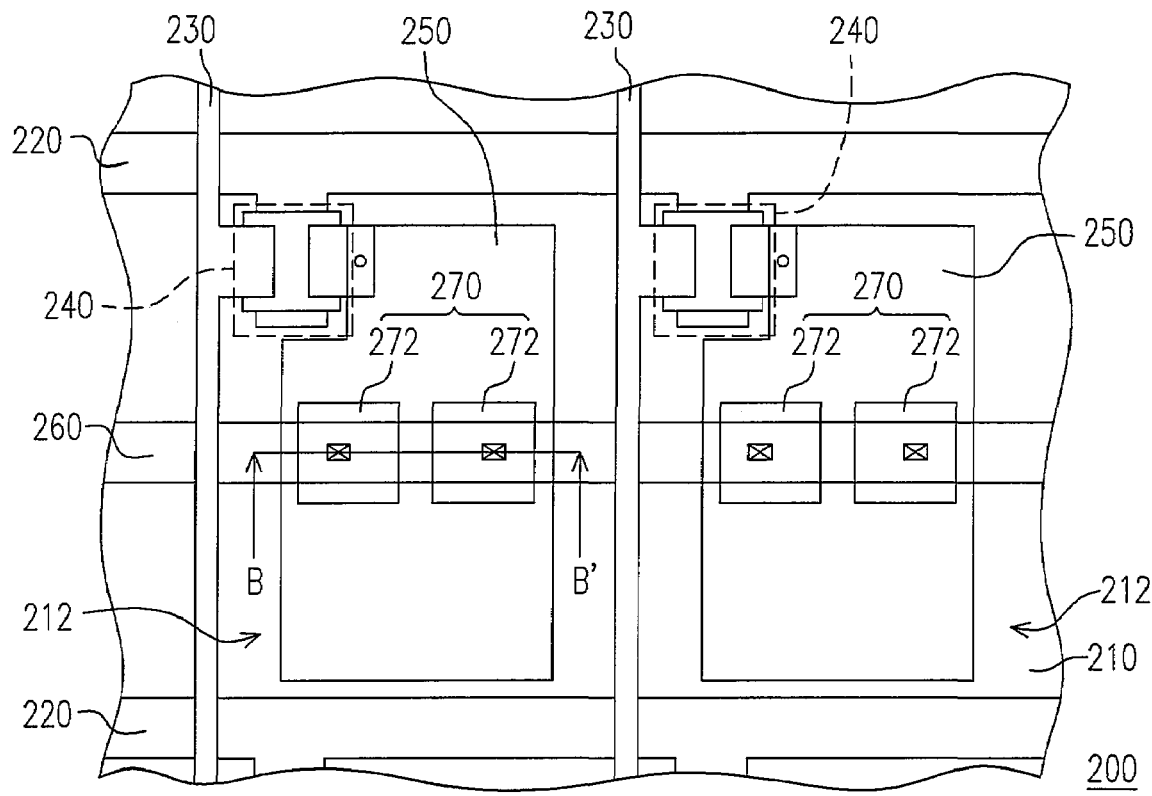
FIG. 3 is a top view of a thin film transistor array substrate according to one preferred embodiment of the present invention.
Figure 4:
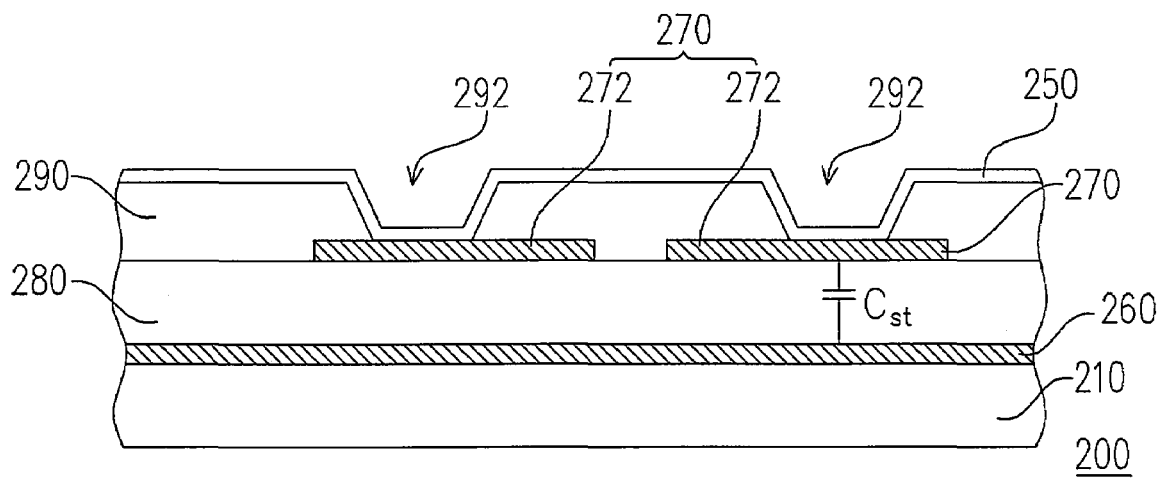
FIG. 4 is a schematic cross-sectional view along line B-B' of the thin film transistor array substrate in FIG. 3.

FIG. 3 is a top view of a thin film transistor array substrate according to one preferred embodiment of the present invention. FIG. 4 is a schematic cross-sectional view along line B-B' of the thin film transistor array substrate in FIG. 3. As shown in FIGS. 3 and 4, the thin film transistor array substrate 200 mainly comprises a substrate 210, a plurality of scan lines 220, a plurality of data lines 230, a plurality of thin film transistor 240, a plurality of pixel electrodes 250, a plurality of common lines 260 (only one is shown) and a patterned upper electrode 270.

The scan lines 220 and the data lines 230 are disposed over the substrate 210 to define a plurality of pixel areas 212. Each thin film transistors 240 is disposed inside one of the pixel areas 212 and driven by one of the scan lines 220 and one of the data lines 230. Each pixel electrode 250 is disposed inside one of the pixel areas 212 and electrically connected to one of the thin film transistors 240. The common line 260 is disposed over the substrate 210 such that a portion area of each pixel electrode 250 is above one of the common lines 260.

The patterned upper electrode 270 is disposed between each pixel electrode 250 and the corresponding common line 260. A dielectric layer 280 is disposed between the patterned upper electrode 270 and the common line 260. Another dielectric layer 290 is disposed between the patterned upper electrode 270 and the pixel electrode 250. It should be noted that the patterned upper electrode 270 comprises a plurality of sub-upper electrodes 272 (only two of them are shown). A portion area of each sub-upper electrode 272 is electrically connected to one of the pixel electrodes 250. For example, a contact 292 is formed in the dielectric layer 290 above each sub-upper electrode 272 so that each sub-upper electrode 272 is electrically connected to one of the pixel electrodes 250. Hence, the sub-upper electrode 272 and one of the common lines 260 together form a storage capacitor (Cst).

Figure 5:
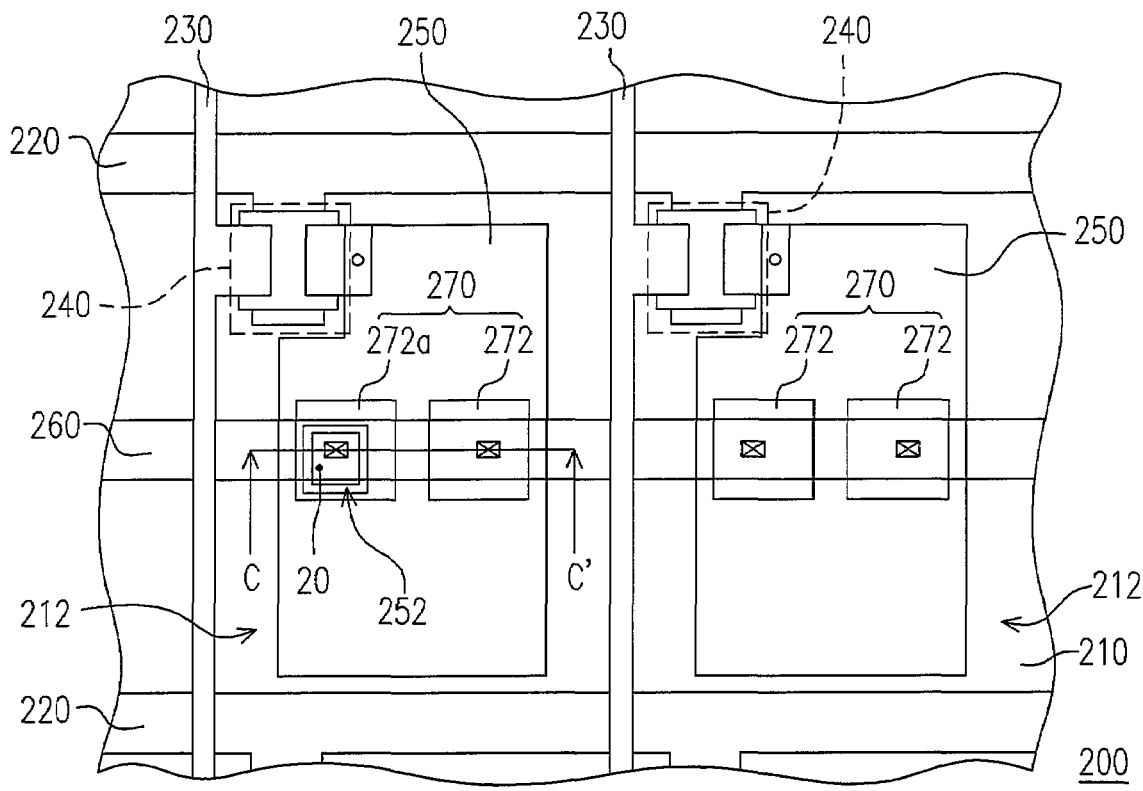
FIG. 5 is a top view of the thin film transistor array substrate in FIG. 3 after performing a laser repairing operation.
Figure 6:
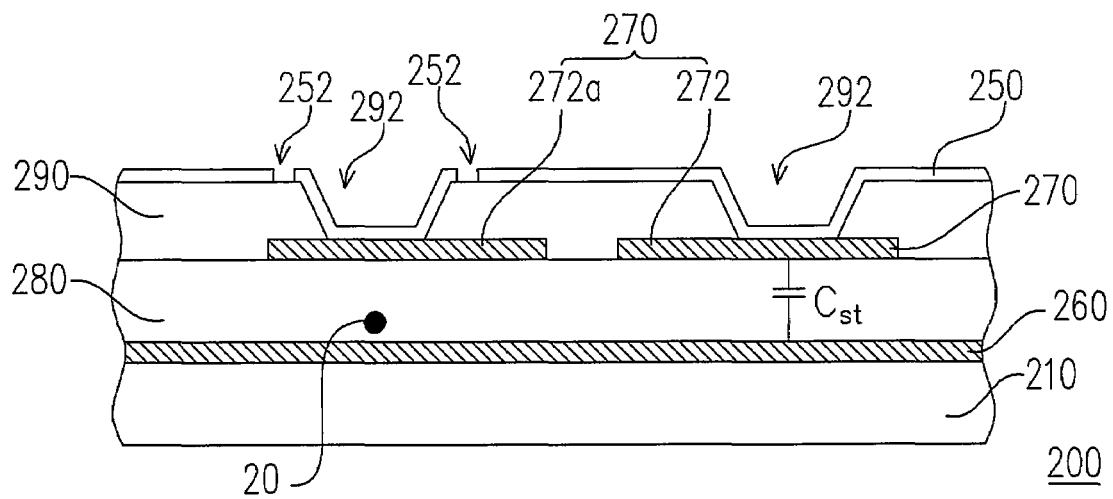
FIG. 6 is a schematic cross-sectional view along C-C' of the thin film transistor array substrate shown in FIG. 5.

FIG. 5 is a top view of the thin film transistor array substrate in FIG. 3 after performing a laser repairing operation. FIG. 6 is a schematic cross-sectional view along C-C' of the thin film transistor array substrate shown in FIG. 5. As shown in FIGS. 5 and 6, if there is a particle (or defect) in the material between one of the sub-upper electrodes 272 and one of the common lines 260, leakage between the sub-upper electrode 272a and the common line 260 may occur. Thus, the pixel may display abnormally and need a repair. The method of repairing the pixel includes removing a portion area of the pixel electrode 250 corresponding to the sub-upper electrode 272a of the defective capacitor so that the sub-upper electrode 272a and the corresponding pixel electrode 250 of the defective capacitor are electrically isolated.

In the present embodiment, a portion area of the pixel electrode 250 above the sub-upper electrode 272a of the corresponding defective capacitor is removed to form an opening 252. The method of removing a portion area of the pixel electrode 250 includes laser ablation, for example. The opening 252 is located around the contact area between the sub-upper electrode 272a and the corresponding pixel electrode 250 of the defective capacitor (that is, around the contact 292). By forming the opening 252, the sub-upper electrode 272a and the corresponding pixel electrode 250 of the defective capacitor are electrically isolated. Since the repair causes no disruption to other sub-upper electrodes, the repaired pixel electrode 250 can function properly.

Figure 7:
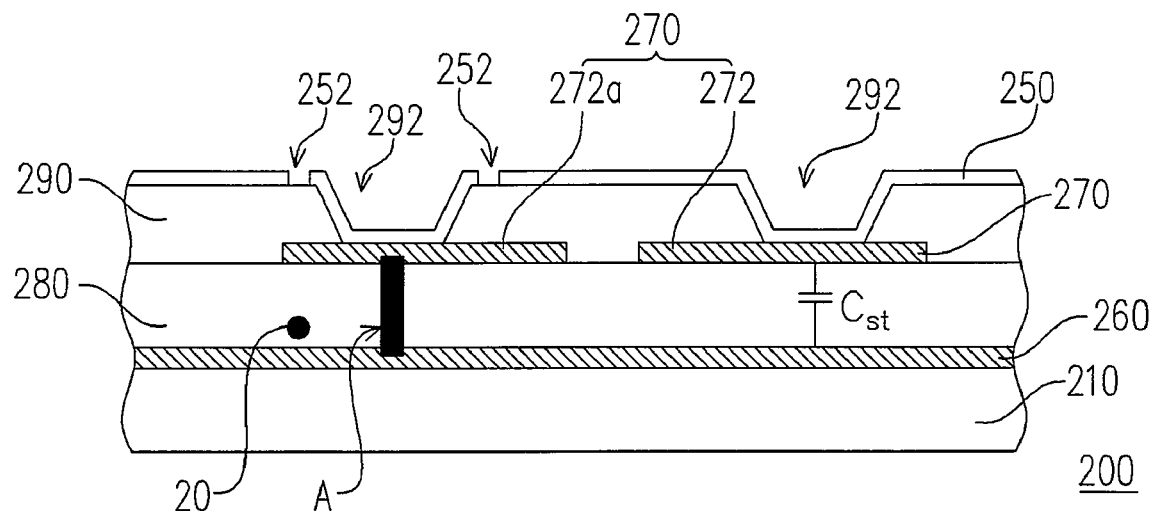
FIG. 7 is a schematic cross-sectional view showing the electrical connection between the common line and the sub-upper electrode in a defective capacitor for repairing a thin film transistor array substrate according to one preferred embodiment of the present invention.

FIG. 7 is a schematic cross-sectional view showing the electrical connection between the common line and the sub-upper electrode in a defective capacitor for repairing a thin film transistor array substrate according to one preferred embodiment of the present invention. After removing a portion area of the pixel electrode 250 corresponding to the sub-upper electrode 272a of the defective capacitor to isolate the sub-upper electrode 272a and the pixel electrode 250 electrically, the sub-upper electrode 272a and the corresponding common line 260 are welded together (labeled A). Hence, the sub-upper electrode 272a and the common line 260 of the defective capacitor are configured at the same potential to prevent any leakage via the particles (or defects). The sub-upper electrode 272a and the corresponding common line 260 are welded together by performing a laser welding process, for example.

In the present invention, the location at which the sub-upper electrode 272a and the corresponding common line 260 of the defective capacitor weld together is underneath the contact 292. However, anyone familiar with the technologies may choose other suitable locations convenient for welding the sub-upper electrode 272a and the corresponding common line 260 of the defective capacitor together.

Figure 8:
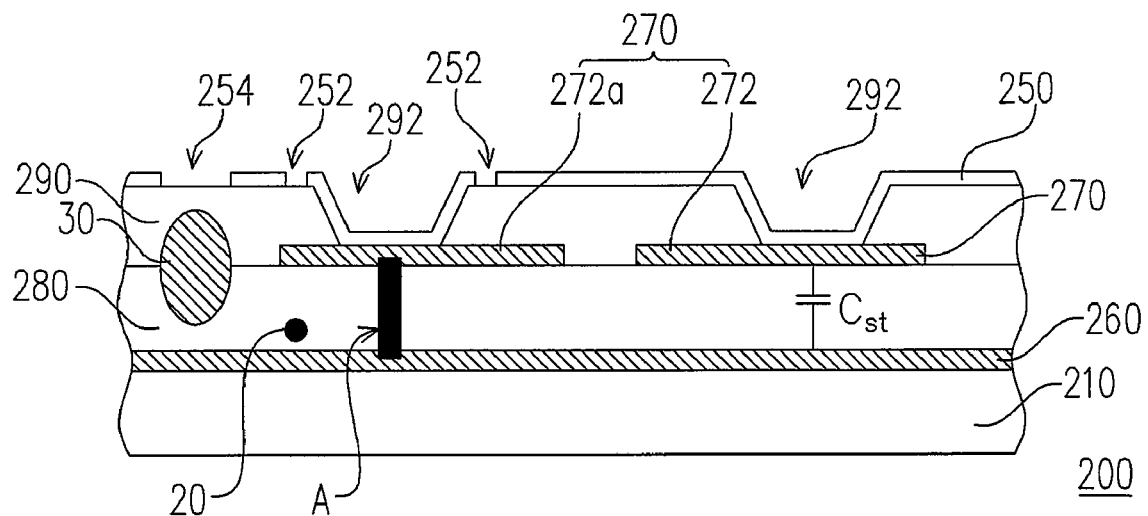
FIG. 8 is a schematic cross-sectional view showing the reparation of a thin film transistor array substrate when a particle is disposed between a pixel electrode and a common line.
Figure 9A:
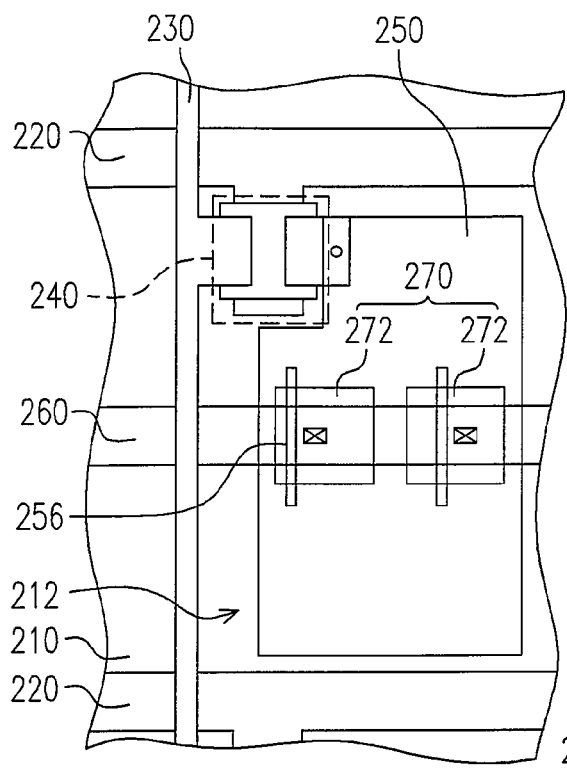
FIGS. 9A through 9D are top views showing different types of thin film transistor array substrates according to another preferred embodiment of the present invention.
Figure 9B:
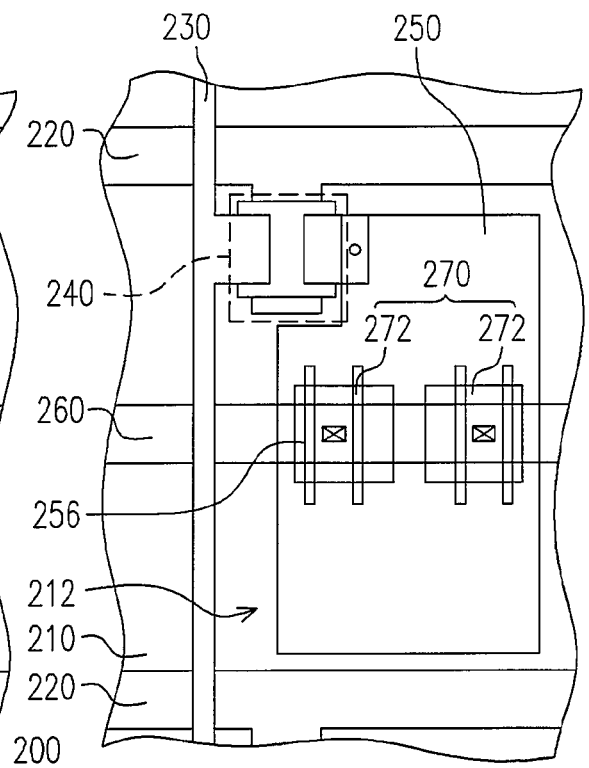
Figure 9C:
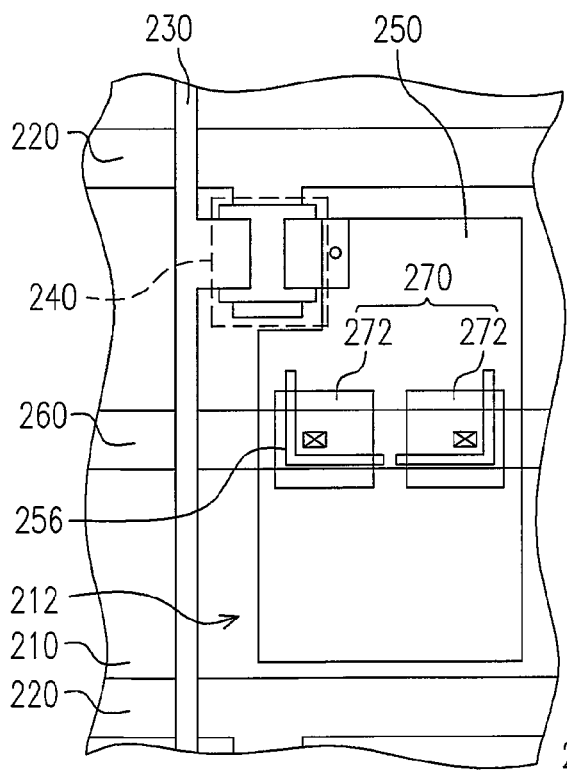
Figure 9D:
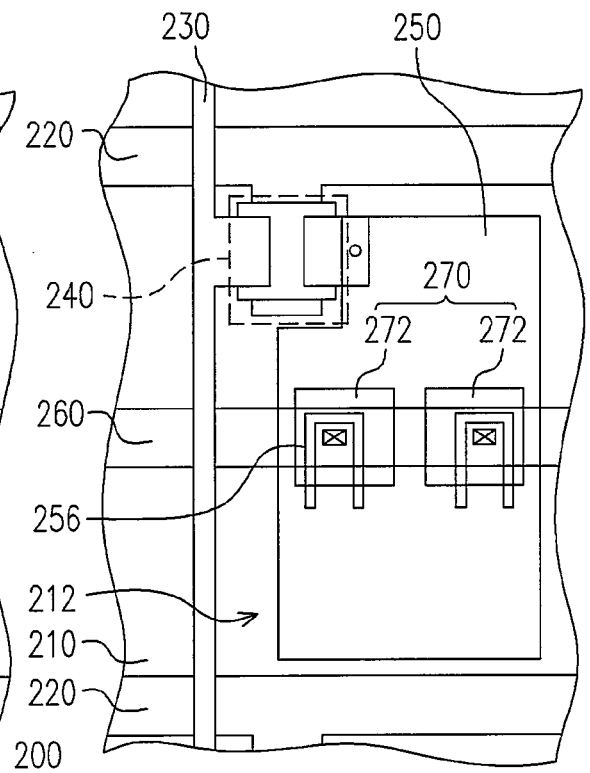

FIG. 8 is a schematic cross-sectional view showing the reparation of a thin film transistor array substrate when a particle is disposed between a pixel electrode and a common line. When a particle 30 (or a defect) is formed inside the layers between the pixel electrode and one of the common lines, the repairing method of the present invention also permits the removal of a portion area of the pixel electrode 250 above the particle 30 (or defect). For example, a portion area of the pixel electrode 250 is removed to form an opening 254 that exposes the particle 30 (or defect) using a laser beam.

FIGS. 9A through 9D are top views showing different types of thin film transistor array substrates according to another preferred embodiment of the present invention. The thin film transistor array substrate of the present embodiment is mostly identical to the one shown in FIG. 3. One major difference is that one or more openings 256 are formed in each pixel electrode 250 when the pixel electrodes 250 are formed. The openings 256 are disposed around the contact region between each sub contact pad 272 and one of the pixel electrodes 250. For example, a straight line opening 256 (shown in FIG. 9A), two straight line openings 256 (shown in FIG. 9B), an L-shaped opening (shown in FIG. 9C) or a U-shaped opening 256 (shown in FIG. 9D) is formed over the pixel electrode 250 corresponding to each sub contact pad 272. With an opening 256 formed over the every pixel electrode 250, a portion area of any one pixel electrode 250 can be readily removed to connect the ends of the opening 256. Hence, an opening similar to the opening 252 that encircles the contact 292 as shown in FIG. 5 can be produced when there is a particle (or defect) between a sub-upper electrode 272 and one of the common lines 260. In the present embodiment, the method of removing a portion area of the pixel electrode 250 includes performing a laser ablation process.

As shown in FIGS. 9A through 9D, a portion area of the opening 256 is disposed above the area occupied by the sub-upper electrode 272 while the remaining portion area of the opening 256 is disposed outside the area occupied by the sub-upper electrode 272. In other words, the openings 256 also cover a region outside the upper electrode 272 to simplify and speed the repairing operation. In addition, anyone familiar with the technology may notice that there is no particular restriction on the dimension of each opening 256.

Figure 10:
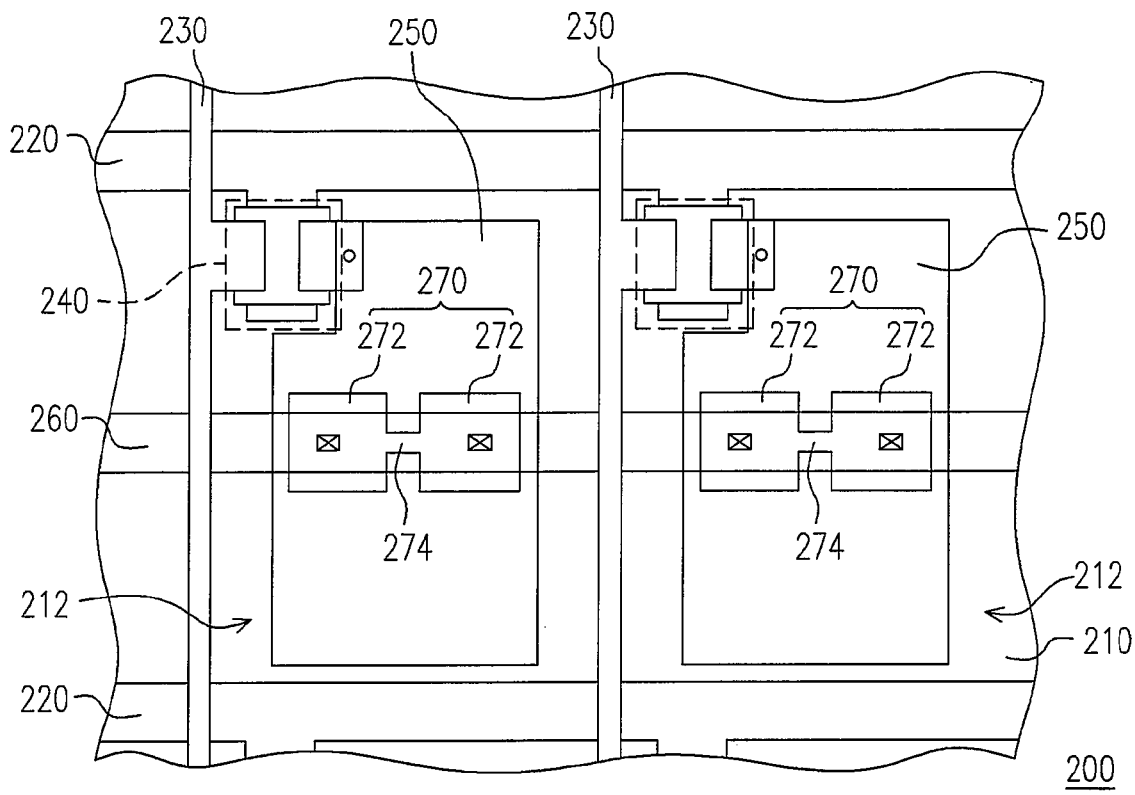
FIG. 10 is a top view of a thin film transistor array substrate according to another preferred embodiment of the present invention.
Figure 11:
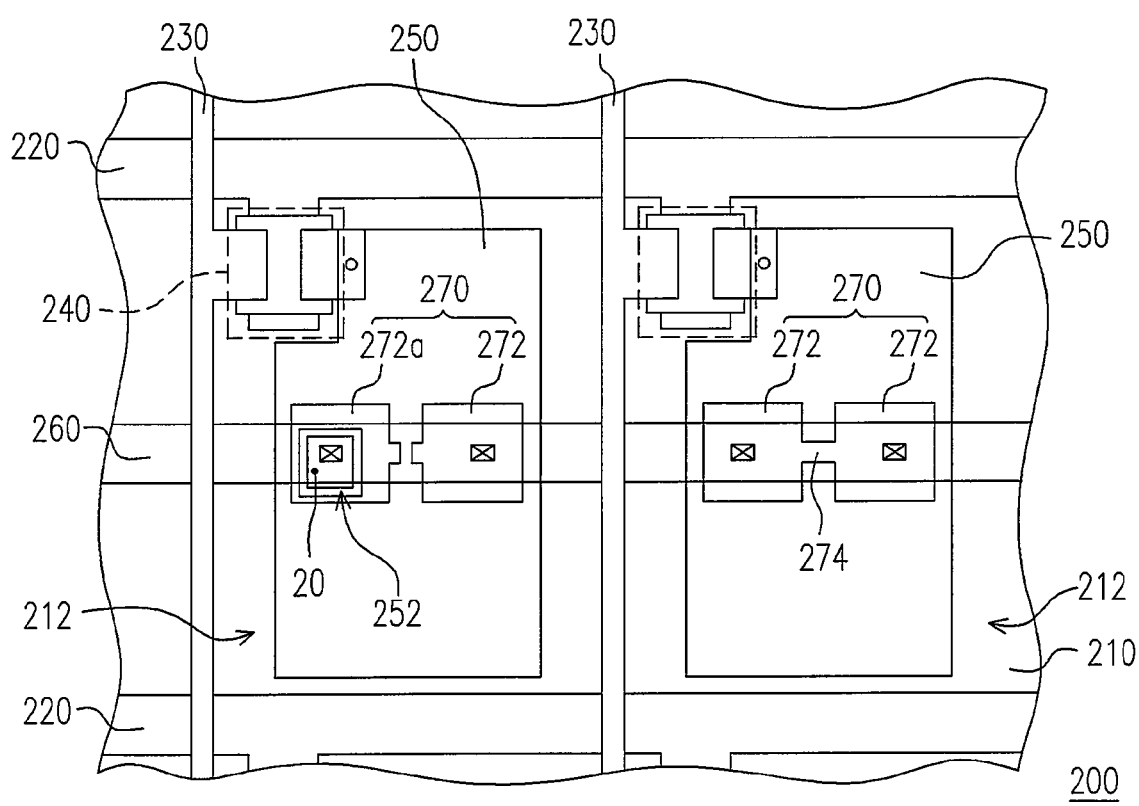
FIG. 11 is a top view of the thin film transistor array substrate in FIG. 10 after a laser repairing operation.

FIG. 10 is a top view of a thin film transistor array substrate according to another preferred embodiment of the present invention. FIG. 11 is a top view of the thin film transistor array substrate in FIG. 10 after a laser repairing operation. In the present embodiment, the thin film transistor array substrate has a structure mostly similar to the one shown in FIG. 3. One major difference of the present embodiment is that the sub-upper electrodes 272 underneath each pixel electrode 250 are mutually connected through a neck portion 274 that can be severed in a repair operation.

In the presence of a particle 20 (or defect) between one of the sub-upper electrode 270 and one of the common lines 260, a leakage between the sub-upper electrode 272a and the common line 260 may occur. To repair such defect, a portion area of the pixel electrode 250 corresponding to the sub-upper electrode 272a of the defective capacitor is removed. Thereafter, the neck portion 274 connecting with the sub-upper electrode 272a of the defective capacitor 272a is cut so that the sub-upper electrode 272a and the corresponding pixel electrode 250 of the defective capacitor are electrically isolated. In the present embodiment, a portion area of the pixel electrode 250 is removed to form an opening 252. The opening 252 is located around the contact area between the sub-upper electrode 272a and the corresponding pixel electrode of the defective capacitor. Furthermore, the method of removing a portion area of the pixel electrode 250 includes performing a laser ablation and the method of cutting the neck portion 274 includes performing a laser cutting operation. After cutting the neck portion 274 connecting the sub-upper electrode 272a of the defective capacitor, the sub-upper electrode 272a and the corresponding pixel electrode 250 are electrically isolated to achieve the goal of repairing a thin film transistor array substrate.

The aforementioned embodiment is applied to repair a thin film transistor array substrate with a capacitor on common line structure (Cst on common). However, the repairing method of the present invention is not limited as such but can be applied to a thin film transistor array substrate with a capacitor on scan line structure (Cst on gate) as well.

Figure 12:
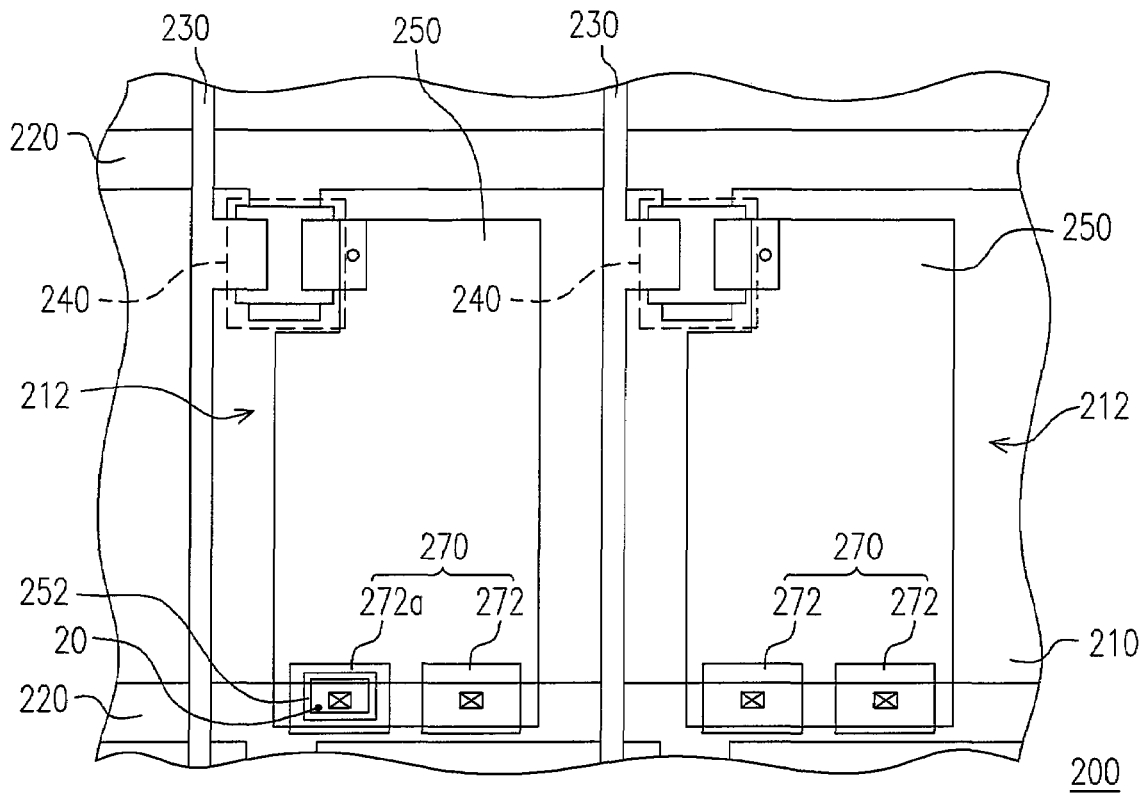
FIGS. 12 and 13 are top views showing the method of repairing the scan line structure of the storage capacitor inside a thin film transistor array substrate according to the present invention.
Figure 13:
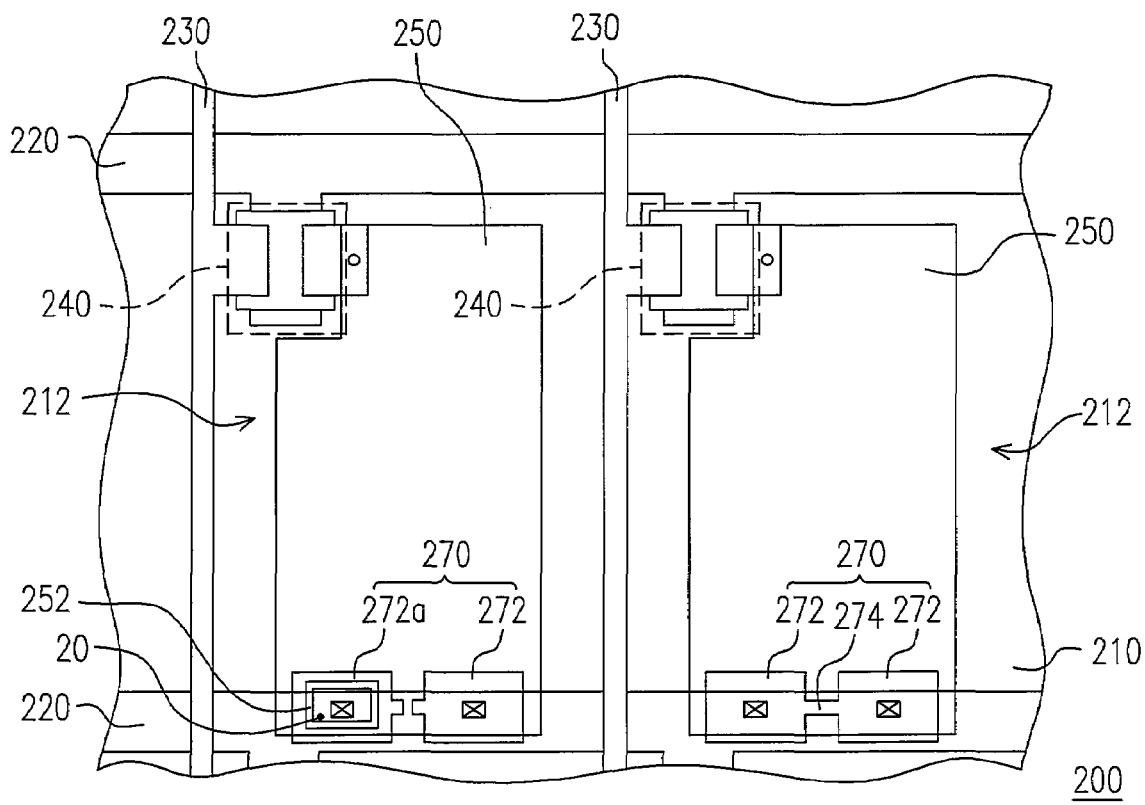

FIGS. 12 and 13 are top views showing the method of repairing the scan line structure of the storage capacitor inside a thin film transistor array substrate according to the present invention. As shown in FIGS. 12 and 13, the thin film transistor array substrate has a capacitor on scan line structure (Cst on gate) similar to one shown in FIG. 5.

As shown in FIG. 12, a portion area of each pixel electrode 250 extends into the area above one of the scan lines 220. The patterned upper electrode 270 is disposed between the pixel electrode 250 and the corresponding scan line 220. The patterned upper electrode 270 comprises a plurality of sub-upper electrodes 272. The sub-upper electrode 272 and its underlying scan line 220 together form a storage capacitor inside each pixel.

As shown in FIG. 13, the patterned upper electrode 270 is disposed between each pixel electrode 250 and one of the scan lines 220. The patterned upper electrode 270 comprises a plurality of sub-upper electrodes 272. Furthermore, each sub-upper electrode 272 underneath the pixel electrode 250 has a neck portion 274 connecting with each other. The neck portion 274 serves as a cutting area in a repairing operation.

In the presence of a particle (or defect) 20 in the material between one of the sub-upper electrodes 272 and one of the scan lines 220, leakage between the sub-upper electrode 272a and the scan line 220 may occur. Thus, the pixel may display abnormally and need a repair. The method of repairing the pixel includes removing a portion area of the pixel electrode 250 corresponding to the sub-upper electrode 272a of the defective capacitor so that the sub-upper electrode 272a and the corresponding pixel electrode 250 of the defective capacitor are electrically isolated.

As shown in FIG. 12, a portion area of the pixel electrode 250 above the sub-upper electrode 272a of the corresponding defective capacitor is removed to form an opening 252. By forming the opening 252 in the pixel electrode 250, the sub-upper electrode 272a and the corresponding pixel electrode 250 of the defective capacitor are electrically isolated. The method of removing a portion area of the pixel electrode 250 includes laser ablation, for example.

As shown in FIG. 13, the repairing method includes removing a portion area of the pixel electrode corresponding to the sub-upper electrode 272a of the defective capacitor to form an opening 252. Furthermore, the neck portion 274 connecting with the sub-upper electrode 272a of the defective capacitor is cut so that the sub-upper electrode 272a of the defective capacitor and the corresponding pixel electrode 250 are electrically isolated. The method of removing a portion area of the pixel electrode 250 includes a laser ablation process and the method of cutting the neck portion 274 includes a laser cutting operation.

After removing a portion area of the pixel electrode corresponding to the sub-upper electrode of the defective capacitor, the sub-upper electrode of the defective capacitor and one of the scan lines can be electrically connected by performing a laser welding process. Similarly, if a particle (or defect) is found between the pixel electrode and one of the scan lines, the pixel electrode above the particle (or defect) can be removed using a laser removing method. In addition, the process of fabricating the pixel electrode may include forming one or more openings similar to the ones described in FIGS. 9A through 9D to facilitate a laser repair operation.

It should be noted that the repairing method of the present invention could be applied to repair a thin film transistor array substrate having a single upper electrode beside repairing a thin film transistor array substrate having a patterned upper electrode thereon.

Figure 14:
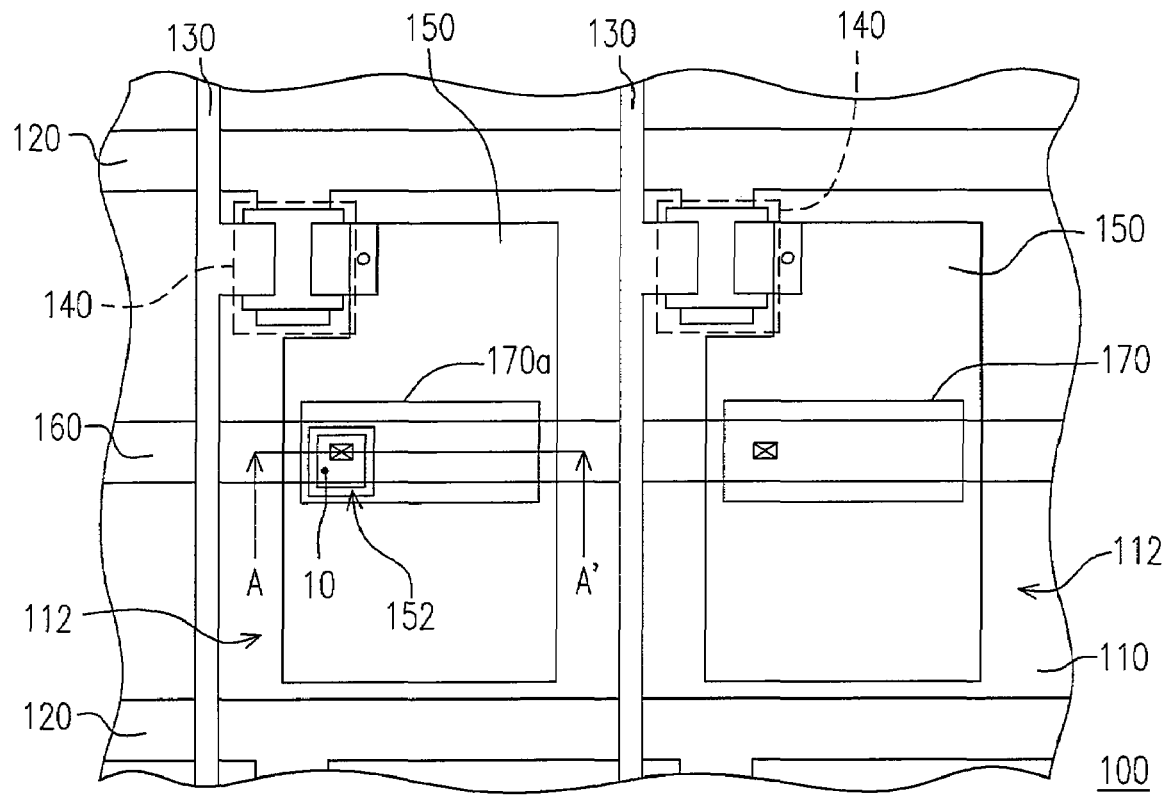
FIGS. 14 and 15 are top view and cross-sectional view showing the configuration after applying the method of the present invention to repair a conventional thin film transistor array substrate.
Figure 15:
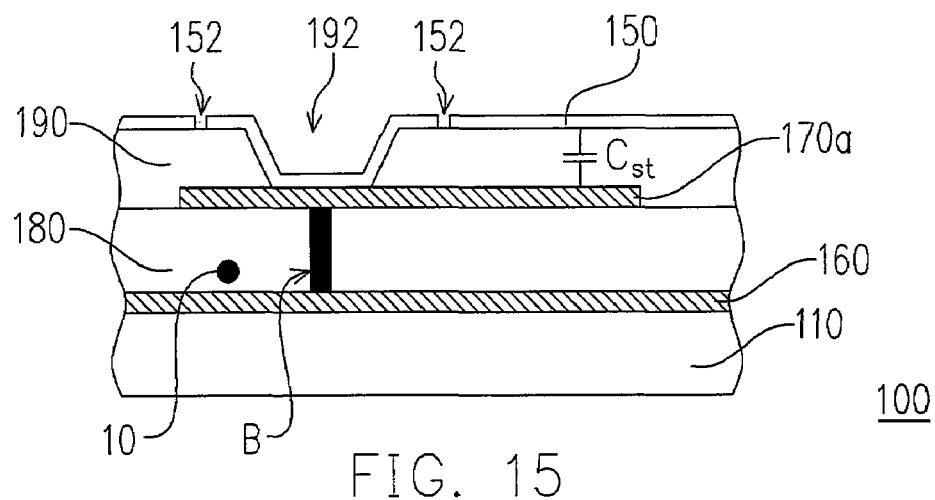

FIGS. 14 and 15 are top view and cross-sectional view showing the configuration after applying the method of the present invention to repair a conventional thin film transistor array substrate. As shown in FIGS. 14 and 15, a conventional thin film transistor array substrate 100 has an upper electrode 170 between every pixel electrode 150 and corresponding common line 160. In the presence of a particle (or defect) 10 between any upper electrode 170 and the corresponding common line 160, the repairing method of the present invention can be used to rectify the problem. The repairing method of the present embodiment includes removing a portion area of the pixel electrode 150 corresponding tot he upper electrode 170a of the defective capacitor so that the upper electrode 170a and the pixel electrode 150 of the defective capacitor is electrically isolated. Thereafter, the upper electrode 170a and the corresponding common line 160 are welded together. Obviously, whether to weld the upper electrode 170a and the common line 160 of the defective capacitor together can be determined by the amount of leakage in the defective capacitor.

In the present embodiment, a portion area of the pixel electrode 150 above the upper electrode 170a of the corresponding defective capacitor is removed to form an opening 152. The method of removing a portion area of the pixel electrode 150 includes laser ablation, for example. The opening 152 is located around the contact area between the upper electrode 170a and the corresponding pixel electrode 150 of the defective capacitor (that is, around the contact 192). By forming the opening 152, the upper electrode 170a and the corresponding pixel electrode 150 of the defective capacitor are electrically isolated. Thereafter, the upper electrode 170a and the corresponding common line 160 are welded together (as shown in label B), for example, by performing a laser welding process, so that the upper electrode 170a and the common line 160 of the defective capacitor are configured at the same potential.

Obviously, in the presence of a particle or defects (not shown) between the pixel electrode and one of the common lines 160, the pixel electrode 150 above the particle (or defect) can be removed in a laser ablation process.

Figure 16A:
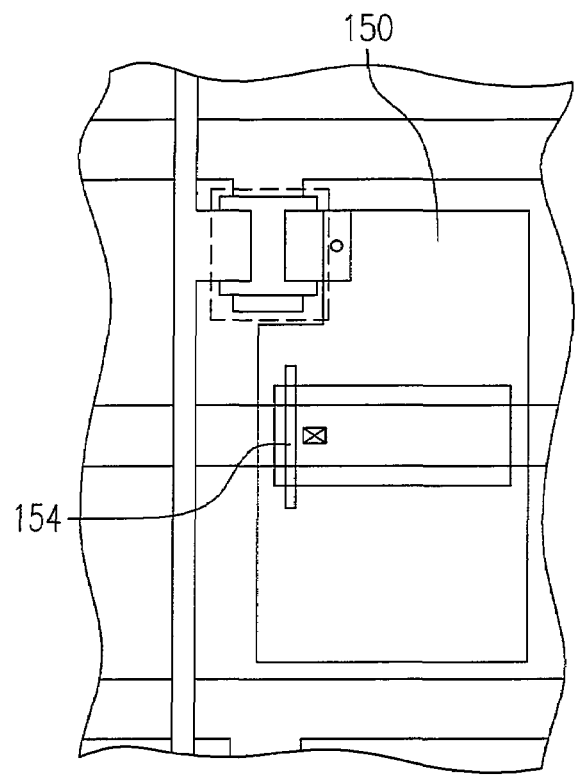
FIGS. 16A through 16D show the types of openings formed on the pixel electrode of a conventional thin film transistor array substrate.
Figure 16B:
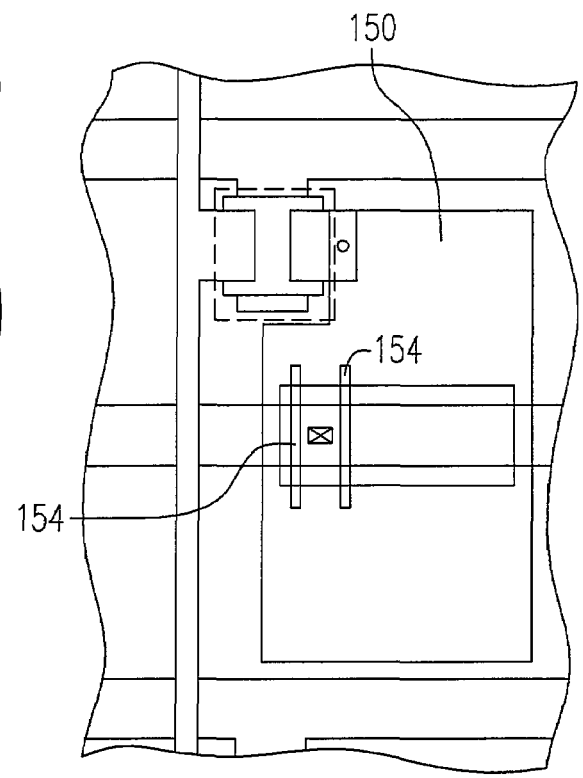
Figure 16C:
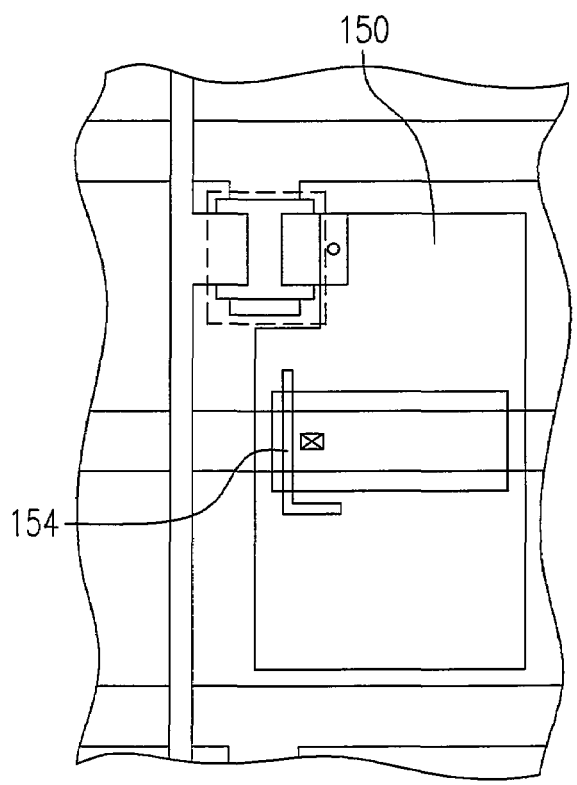
Figure 16D:
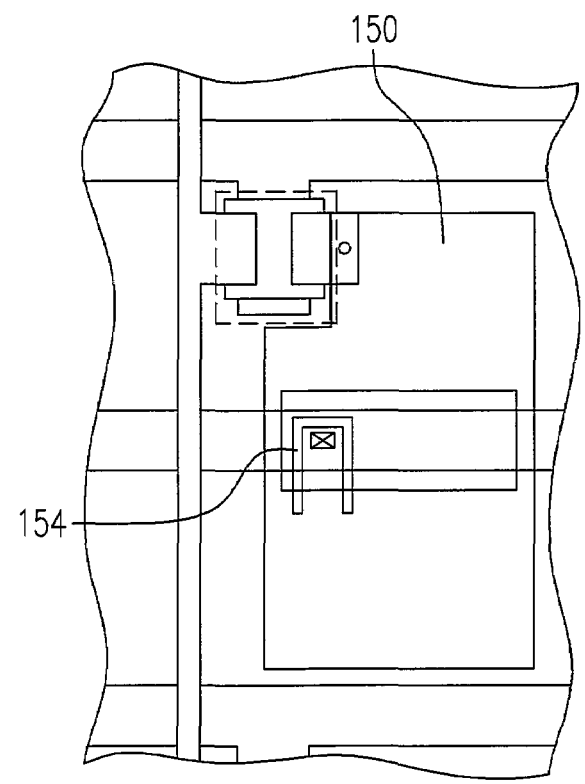

FIGS. 16A through 16D show the types of openings formed on the pixel electrode of a conventional thin film transistor array substrate. To simplify and speed up the repairing process, one or more openings 154 are also formed over the thin film transistor array substrate in the process of fabricating the pixel electrode 150. For example, a straight line opening 154 (as shown in FIG. 16A), a pair of straight line openings 154 (as shown in FIG. 16B), an L-shaped opening 154 (as shown in FIG. 16C) or a U-shaped opening 154 (as shown in FIG. 16D) are formed over the pixel electrode 150. Since the openings 154 are similar to the openings disclosed in FIGS. 9A through 9D, detailed description is omitted.

Accordingly, in the conventional thin film transistor array substrate 100, an upper electrode 170 and an electrically connected pixel electrode 150 together with a common line 160 form a metal-insulator-metal (MIM) storage capacitor structure. When the material layer between the upper electrode 170 (the upper electrode 170a) and one of the common lines 160 contains a particle 10 (or defect), the MIM storage capacitor is defective. To repair the defective capacitor, a portion area of the pixel electrode 150 corresponding to the upper electrode 170a of the defective capacitor can be removed so that the upper electrode 170a and the corresponding pixel electrode 150 are electrically isolated. Thereafter, the upper electrode 170a and the corresponding common line 160 of the defective capacitor are welded together so that the pixel electrode 150 and the upper electrode 170a of the defective capacitor form a storage capacitor having a metal-insulator-pixel electrode structure.

It should be noted that the thin film transistor array substrate 100 in FIGS. 14 and 15 has capacitor on common line (Cst on common) storage capacitor thereon. However, anyone familiar with the technology can apply the repairing method of the present invention to a substrate having a capacitor on gate (Cst on gate) storage capacitor thereon.

In addition, the thin film transistor array substrate according to the present invention can be applied to a multi-domain vertical alignment liquid crystal display (MVA-LCD) as well. The pixel electrodes of the liquid crystal display are shaped into slits so that the field direction changes from one substrate board to another. Furthermore, the liquid crystal molecules between the substrate boards can be uniformly aligned in various domains so that the liquid crystal display panel can have a wide viewing angle.

Figure 17:
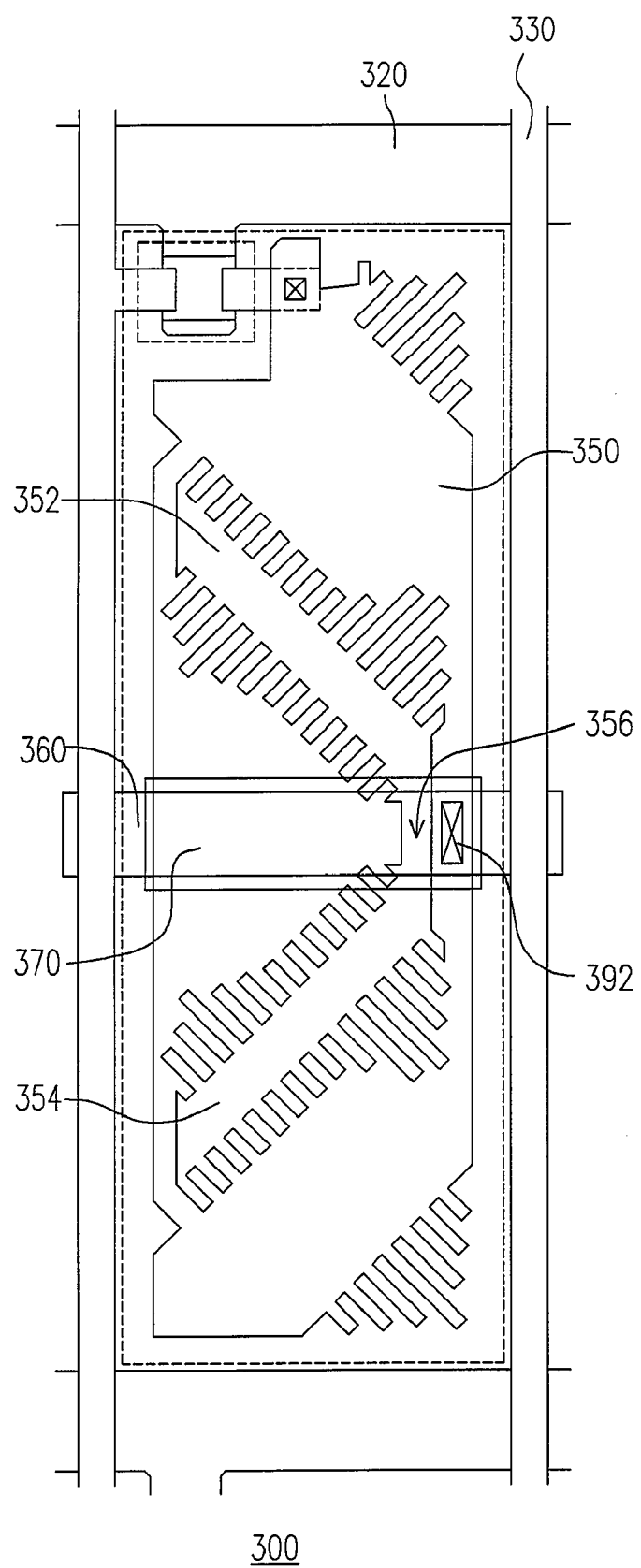
FIG. 17 is a top view showing a thin film transistor array substrate applied to a multi-domain vertical alignment liquid crystal display (MVA-LCD) according to yet another preferred embodiment of the present invention.

FIG. 17 is a top view showing a thin film transistor array substrate applied to a multi-domain vertical alignment liquid crystal display (MVA-LCD) according to yet another preferred embodiment of the present invention. The thin film transistor array substrate 300 in the present embodiment has a structure very similar to the thin film transistor array substrate disclosed in FIG. 1. Hence, only the dissimilar portions are described in the following.

The thin film transistor array substrate 300 has at least a first slit 352 and at last a second slit 354 disposed over each pixel electrode 350. The first slit 352 extends in a direction different from the second slit 354 and the direction of extension of the first and the second slit 352, 354 are different from the scan line 320, the data line 330 or the common line 360. In addition, a first slit 352 and one of the second slits 354 are connected together through a connecting area 356 when the first slits 352 and the second slits 354 are formed. The electrical contact area (the contact 392) between the upper electrode 370 and the corresponding pixel electrode 350 are adjacent to the connecting area 356 between the first and the second slit. Furthermore, the upper electrode 370 and the corresponding common line 360 are coupled to form a capacitor.

Figure 18:
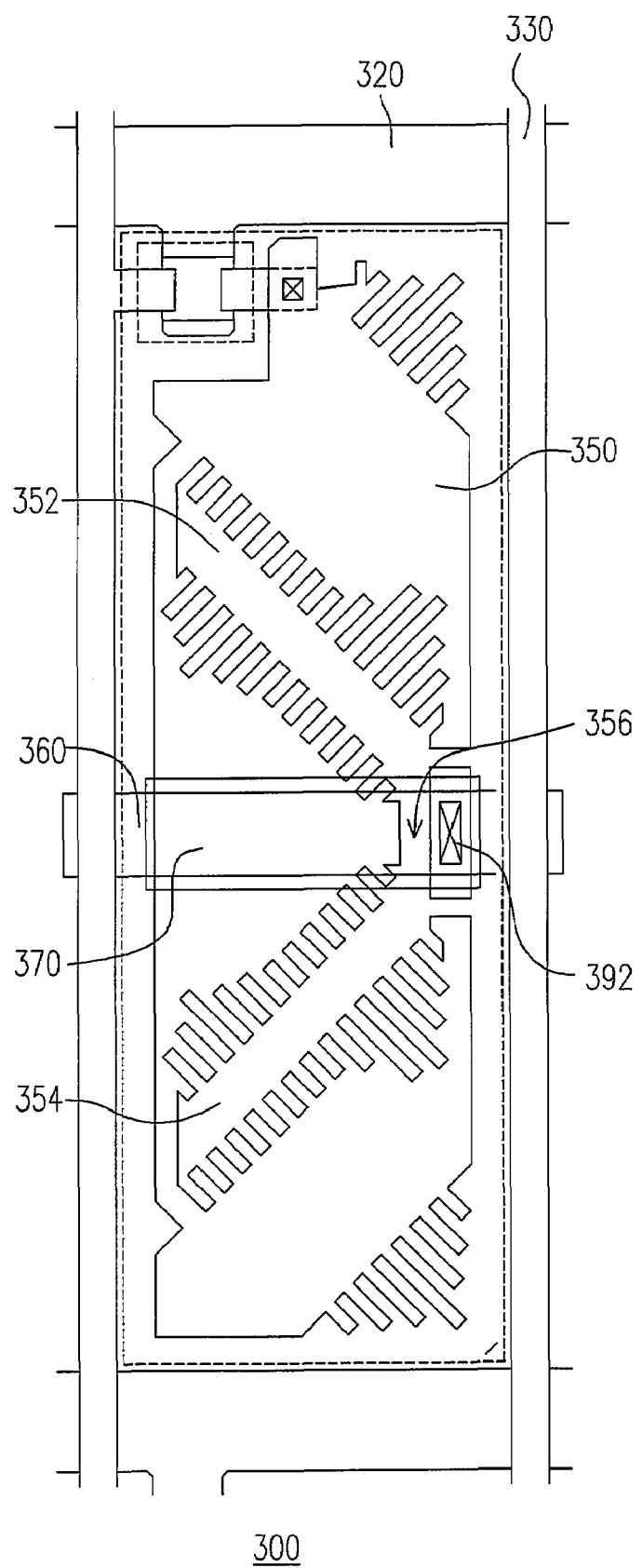
FIG. 18 is a top view of the thin film transistor array substrate of the MVA-LCD in FIG. 17 repaired according to the method of the present invention.

It should be noted a repair is required when a particle or defect is formed between the upper electrode 370 and one of the common lines 360 so that the upper electrode 370 and the common line 360 together form a defective capacitor. FIG. 18 is a top view of the thin film transistor array substrate of the MVA-LCD in FIG. 17 repaired according to the method of the present invention. The repairing method includes removing a portion area of the pixel electrode 350 corresponding to the upper electrode of the defective capacitor. In the present embodiment, the portion area of the pixel electrode 350 to be removed is the area around the electrical contact (the contact 392) between the upper electrode 370 and the corresponding pixel electrode 350. Thus, the upper electrode 370 of the defective capacitor and the corresponding pixel electrode 350 are electrically isolated. In other words, by removing a small portion of the pixel electrode 350 (a small area around contact 392) covering the upper electrode 370, the upper electrode 370 and the corresponding pixel electrode 350 of the defective capacitor are electrically isolated. Since only a small portion of the pixel electrode 350 covering the upper electrode 370 is removed in the present embodiment, a large capacitance can be maintained after the repair operation.

Thereafter, the upper electrode 370 and the corresponding common line 360 of the defective capacitor are welded together so that the upper electrode 370 and the corresponding common line 360 of the defective capacitor are at the same potential. Obviously, whether to weld the upper electrode 370 and the common line 360 of the defective capacitor together can be determined by the amount of leakage in the defective capacitor.

Accordingly, in the thin film transistor array substrate 300, an upper electrode 370 and an electrically connected pixel electrode 350 together with a common line 360 form a metal-insulator-metal (MIM) storage capacitor structure. When the material layer between the upper electrode 370 and one of the common lines 360 contains a particle 10 or defect, the MIM storage capacitor is defective. To repair the defective capacitor, a portion area of the pixel electrode 350 around the contact 392 is removed so that the upper electrode 370 and the pixel electrode 350 are electrically isolated. Therefore, the pixel electrode 350 and the upper electrode 370 of the defective capacitor together form a storage capacitor having a metal-insulator-pixel electrode structure.

Obviously, if a particle of defect is found between the pixel electrode 350 and one of the common lines 360 of the aforementioned thin film transistor array substrate 300, the pixel electrode 350 above the particle or defect can be removed. Thus, the particle or defect is electrically isolated from the pixel electrode 350.

In summary, the thin film transistor array substrate and repairing method of the present invention has the following advantages:

1. The repairing method prevents any leakage between the upper and lower electrode of a storage capacitor in the presence of particle or defect between the two electrodes.
2. The patterned upper electrode can be fabricated together with the second metallic layer (M2) including the data line, the drain and the source. Hence, no additional processing cost is incurred.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A thin film transistor array substrate, comprising:
   a substrate;
   a plurality of scan lines disposed over the substrate;
   a plurality of data lines disposed over the substrate, wherein the scan lines and the data lines together define a plurality of pixel areas;
   a plurality of thin film transistors with each thin film transistor disposed inside one of the pixel areas, wherein each thin film transistor is driven by one of the scan lines;
   a plurality of pixel electrodes with each pixel electrode disposed inside one of the pixel areas and electrically connected to one of the thin film transistors, wherein a portion area of each pixel electrode is disposed above one of the scan lines; and
   a patterned upper electrode disposed between each pixel electrode and one of the scan lines, wherein the patterned upper electrode further comprises a plurality of sub-upper electrodes with a portion area of each sub-upper electrode electrically connected to one of the pixel electrodes.

2. The thin film transistor array substrate of claim 1, wherein the patterned upper electrode further comprises a plurality of neck portions with each neck portion connecting to a pair of adjacent sub-upper electrodes.

3. The thin film transistor array substrate of claim 1, wherein one of the pixel electrodes further comprises at least an opening located around a portion of each sub-upper electrode.

4. The thin film transistor array substrate of claim 3, wherein the opening has a stripe shape, an L shape or a U shape.

5. The thin film transistor array substrate of claim 3, wherein a portion of each opening is above the sub-upper electrode and the remaining portion of the opening is above an area outside the sub-upper electrode.

6. A thin film transistor array substrate, comprising:
a substrate;
a plurality of scan lines disposed over the substrate;
a plurality of data lines disposed over the substrate, wherein the scan lines and the data lines together define a plurality of pixel areas;
a plurality of thin film transistors with each thin film transistor disposed inside one of the pixel areas, wherein each thin film transistor is driven by one of the scan lines;
a plurality of pixel electrodes with each pixel electrode disposed inside one of the pixel area and electrically connected to one of the thin film transistors, wherein a portion area of each pixel electrode is disposed above one of the scan lines; and
a patterned upper electrode disposed between each pixel electrode and one of the scan lines, wherein the patterned upper electrode further comprises a plurality of sub-upper electrodes with each sub-upper electrode electrically connected to one of the pixel electrodes, the sub-upper electrode couples with the common line to form a plurality of capacitors, and when one of the capacitors is a defective capacitor, the sub-upper electrode of the defective capacitor is electrically isolated from one of the pixel electrodes while a portion area of the other sub-upper electrodes are electrically connected to their corresponding pixel electrodes.

7. The thin film transistor array substrate of claim 6, wherein the sub-upper electrode of the defective capacitor and one of the scan lines are welded together.

8. The thin film transistor array substrate of claim 6, wherein an opening is in the pixel electrode above the particle/defect when a particle/defect lies between the pixel electrode and one of the scan lines so that the particle/defect is electrically isolated from the pixel electrode.

9. The thin film transistor array substrate of claim 6, wherein the patterned upper electrode further comprises a plurality of neck portion connecting to the sub-upper electrode of the defective capacitor with an adjacent sub-upper electrode.

10. The thin film transistor array substrate of claim 9, wherein the sub-upper electrode of the defective capacitor and the corresponding scan line are welded together.

11. The thin film transistor array substrate of claim 9, wherein an opening is in the pixel electrode above the particle/defect when a particle/defect lies between the pixel electrode and one of the scan lines so that the particle/defect is electrically isolated from the pixel electrode.

12. A thin film transistor array substrate, comprising:
a substrate;
a plurality of scan lines disposed over the substrate;
a plurality of data lines disposed over the substrate, wherein the scan lines and the data lines together define a plurality of pixel areas;
a plurality of thin film transistors with each thin film transistor disposed inside one of the pixel areas, wherein each thin film transistor is driven by one of the scan lines;
a plurality of pixel electrodes with each pixel electrode disposed inside one of the pixel areas and electrically connected to one of the thin film transistors, wherein a portion area of the pixel electrode is disposed above one of the scan lines; and
an upper electrode disposed between each pixel electrode and one of the scan lines, wherein the upper electrode electrically connects with one of the pixel electrodes and couples with the common line to form a capacitor, and when the capacitor is a defective capacitor, the upper electrode of the defective capacitor is electrically isolated from the corresponding pixel electrode.

13. The thin film transistor array substrate of claim 12, wherein the upper electrode of the defective capacitor and the corresponding scan line are welded together.

14. The thin film transistor array substrate of claim 12, wherein an opening is in the pixel electrode above the particle/defect when a particle/defect lies between the pixel electrode and one of the scan lines so that the particle/defect is electrically isolated from the pixel electrode.

* * * * *